US012693578B2

(12) United States Patent
Sakazume

(10) Patent No.: US 12,693,578 B2
(45) Date of Patent: Jul. 28, 2026

(54) PHOTOGRAPHING BOOTH CONSTRUCTION KIT

(71) Applicant: SOMAR CORPORATION, Tokyo (JP)

(72) Inventor: Naoki Sakazume, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 170 days.

(21) Appl. No.: 18/837,759

(22) PCT Filed: Feb. 15, 2023

(86) PCT No.: PCT/JP2023/005177
§ 371 (c)(1),
(2) Date: Aug. 12, 2024

(87) PCT Pub. No.: WO2023/171268
PCT Pub. Date: Sep. 14, 2023

(65) Prior Publication Data
US 2025/0180966 A1 Jun. 5, 2025

(30) Foreign Application Priority Data
Mar. 10, 2022 (JP) ................................. 2022-037164

(51) Int. Cl.
*G03B 15/06* (2021.01)
*G02B 1/111* (2015.01)
(Continued)

(52) U.S. Cl.
CPC .............. *G03B 15/06* (2013.01); *G02B 1/111* (2013.01); *G03B 15/05* (2013.01); *G03B 17/48* (2013.01)

(58) Field of Classification Search
CPC ........ G03B 15/06; G03B 15/05; G03B 17/48; G02B 1/111
(Continued)

(56) References Cited

U.S. PATENT DOCUMENTS

| | | | |
|---|---|---|---|
| 5,664,232 A | 9/1997 | Goto | |
| 10,491,785 B1 | 11/2019 | Arnot | |
| 2023/0305197 A1 | 9/2023 | Sakazume | |

FOREIGN PATENT DOCUMENTS

| | | | |
|---|---|---|---|
| CN | 113696567 | * | 11/2021 |
| JP | 8-146498 A | | 6/1996 |

(Continued)

OTHER PUBLICATIONS

International Search Report Corresponding to International Application No. PCT/JP2023/005177 dated Apr. 25, 2023, 3 pages.

*Primary Examiner* — Joel W Fosselman
(74) *Attorney, Agent, or Firm* — Rankin, Hill & Clark LLP

(57) ABSTRACT
A kit for constructing a photographing booth, which is effective for photographing a subject to be photographed clearly. The photographing construction kit includes a box unit in a square cylindrical shape able to be folded, a lid unit in a rectangular flat plane shape, a rolled back sheet to be laid as a background of a subject to be photographed, and a roller for placing the back sheet 6 thereover. A black antireflection film is provided on a main surface side of the back sheet so that it faces the subject to be photographed. The antireflection film is configured by a membrane having a thickness of 2 μm or more and 40 μm or less formed from a liquid composition having a specific composition by spray coating.

20 Claims, 5 Drawing Sheets

(51) Int. Cl.
*G03B 15/05*          (2021.01)
*G03B 17/48*          (2021.01)
(58) Field of Classification Search
USPC ........................................................... 396/3
See application file for complete search history.

(56)                    References Cited

FOREIGN PATENT DOCUMENTS

| | | | |
|---|---|---|---|
| JP | 10-148702 | A | 6/1998 |
| JP | 10-260461 | A | 9/1998 |
| JP | 2018-052804 | A | 4/2018 |
| JP | 2018-144852 | A | 9/2018 |
| WO | 2022/045319 | A1 | 3/2022 |
| WO | 2023/002941 | A1 | 1/2023 |
| WO | 2023/002942 | A1 | 1/2023 |

* cited by examiner

[FIG. 2]
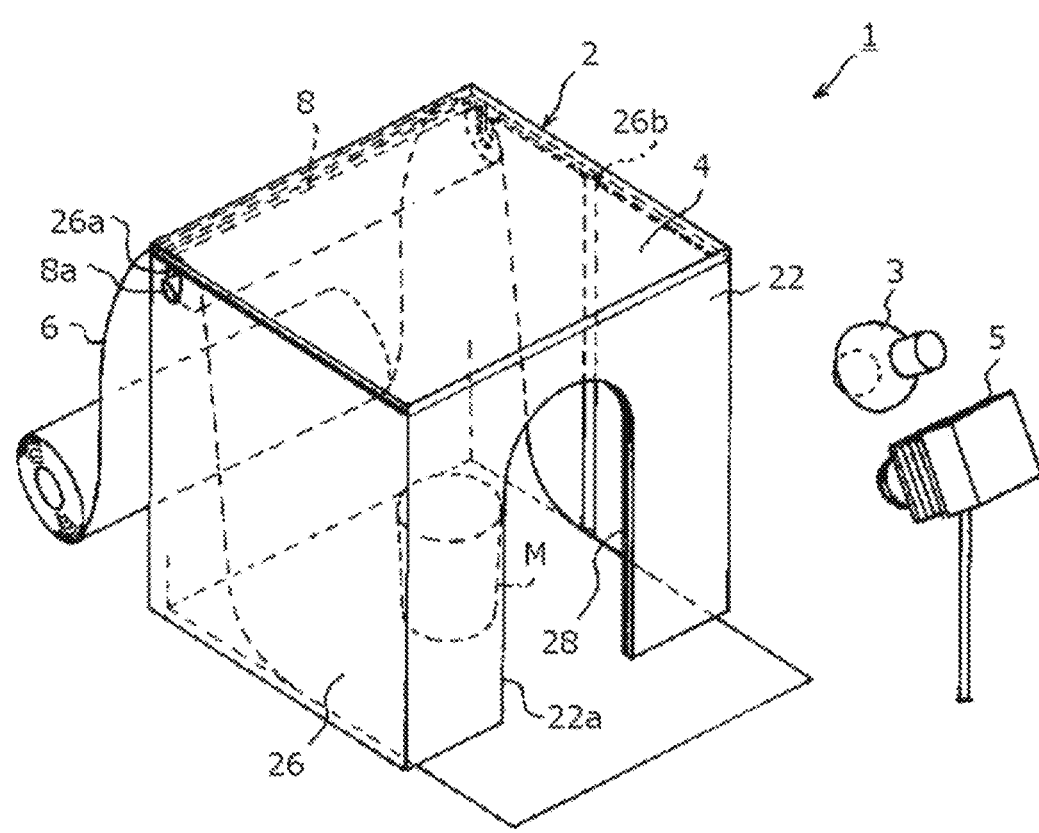
[FIG. 3]
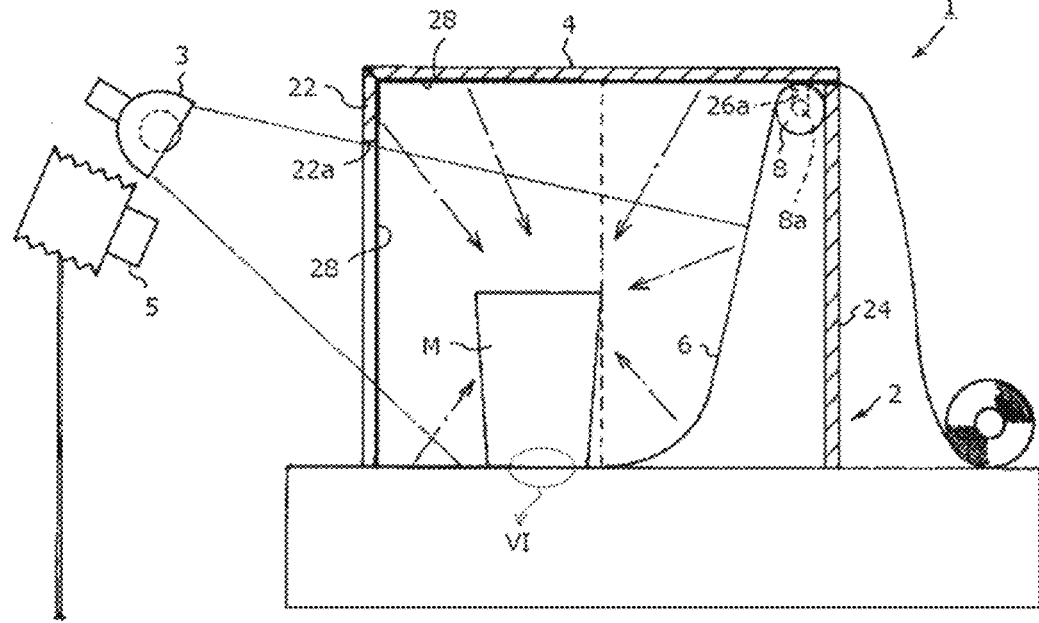

PHOTOGRAPHING BOOTH CONSTRUCTION KIT

CROSS-REFERENCE TO RELATED APPLICATION

This application is a U.S. national stage filing under 35 U.S.C. § 371 of PCT Application. No. PCT/JP2023/005177, filed on Feb. 15, 2023, which is hereby incorporated by reference in its entirely.

TECHNICAL FIELD

The present invention relates to a kit for constructing a photographing booth, which is effective to photograph a subject clearly.

BACKGROUND ART

There is known a small-scaled studio kit so-called a mobile studio, which can be installed in a necessary place to enable photographing products, etc. for catalogs and pamphlets, etc. under a preferable environment (Patent Document 1). The small-scaled studio assembled from this kit comprises an upper box unit having an upper light source, a central box unit as a photographing space for arranging therein a subject to be photographed in a state of shielding an unnecessary incident light from outside (hereinafter, also simply referred to as "an unnecessary light"), a lower box plate, on which a lower light source is arranged, and a space part for incorporating a drive unit, such as a generator. It is configured that the upper box unit is opened to set a subject to be photographed in the central box unit installed with a light diffusion member, and after adjusting the light source of the upper light source, etc., the subject is photographed by an image pickup means fixed to the central box unit.

RELATED ART DOCUMENTS

Patent Document

Patent Document 1: H08-146498, publication

SUMMARY OF THE DISCLOSED SUBJECT MATTER

However, when photographing by using the compact studio according to the patent document 1, a light from a stroboscope diffuses on an inner wall surface (a background of a subject to be photographed, in particular) of the central box unit to cause halation, so that a clear photograph could not obtained in some cases.

The present invention was made in consideration with the circumstances above. The present invention has an object thereof to provide a kit for constructing a photographing booth used for photographing a subject, which prevents halation caused by a stroboscope light so as to provide an antireflection film effective to photograph the subject clearly to a back sheet as a background of the subject to be photographed.

The present inventors conducted studies diligently and found that when a black antireflection film formed on the back sheet as a background of a subject to be photographed included in a kit for constructing a photographing booth fulfills the following requirements, it is effective to photograph a subject to be photographed clearly.

To use a liquid composition having a specific composition comprising a predetermined ratio of unevenness forming particles comprising, in a range of a predetermined mass ratio, large and small inorganic-type particles having particle diameters in predetermined ranges.

To use a liquid composition having a specific composition explained above to form a membrane having a predetermined thickness by a spray coating.

Based on these newly acquired knowledge, the present inventors completed the invention as provided below and attained the object above.

Below, (A) indicates a resin component, (B) unevenness forming particles, (B1) inorganic small particles having a particle diameter $(d_1)$ of 0.05 µm or more and 0.4 µm or less, (B2) inorganic large particles having a particle diameter $(d_2)$ of 2 µm or more and 6 µm or less, and (C) a diluent solvent.

According to the present invention, there is provided a kit for constructing a photographing booth used for photographing a subject to be photographed, comprising at least a back sheet arranged as a background of the subject to be photographed in a photographing space, wherein the back sheet has a black antireflection film on a main surface side, which faces the subject to be photographed;

the antireflection film is configured by a membrane having a thickness of 2 µm or more and 40 µm or less formed from a liquid composition by spray coating;

the liquid composition comprises at least (A), (B) and (C);

(B) is contained in an amount of 20% by mass or more and 60% by mass or less in a total amount of 100% by mass of all solid content in the composition;

(B) comprises (B1) and (B2) in an amount of 90% by mass or more and a mass ratio of (B2) with respect to (B1):1 is 1.8 or more and 3.3 or less.

According to the present invention, there is provided a black antireflection film, formed on a back sheet arranged as a background of a subject to be photographed in a photographing space in a kit for constructing a photographing booth used for photographing a subject to be photographed, configured by a membrane having a thickness of 2 µm or more and 40 µm or less formed from a liquid composition by spray coating:

wherein the liquid composition comprises at least (A), (B) and (C);

(B) is contained in an amount of 20% by mass or more and 60% by mass or less in a total amount of 100% by mass of all solid content in the composition;

(B) comprises (B1) and (B2) in an amount of 90% by mass or more, and a mass ratio of (B2) with respect to (B1):1 is 1.8 or more and 3.3 or less The liquid composition explained above may include the modes below.

Preferably, (B2) comprises silica.

Preferably, silica includes complex silica colored black with a colorant.

Preferably, (B1) comprises carbon black.

Preferably, viscosity at 25° C. is 1 mPa·s or more and 30 mPa·s or less.

The antireflection film explained above may include the modes below.

Preferably, glossiness against an incident light with an incident angle of 60° (hereinafter, also simply referred to as "60°-glossiness") is less than 1%, glossiness against an incident light with an incident angle of 85° (hereinafter, also simply referred to as "85°-glossiness") is less than 5%, reflectance against a light having a wavelength of 550 nm (hereinafter, also simply referred to as "reflectance") is 4% or less, an L value in CIELAB color space system by SCE method is 22 or less, and an optical density is 1.0 or more.

On an outermost surface of a plane formed with a membrane, it is preferable that a maximum height Rz (hereinafter, also simply referred to as "Rz") based on JIS B0601:2001 is 7 μm or more, an average length Rsm of contour curve elements (hereinafter, also simply referred to as "Rsm") is 80 μm or more, a skewness Rsk of a contour curve (hereinafter, also simply referred to as "Rsk") is 0.3 or less, and Kurtosis Rku of a contour curve (hereinafter, also simply referred to as "Rku") is 3 or more.

According to the present invention, there is provided a kit for constructing a photographing booth used for photographing a subject to be photographed, comprising a back sheet as a background of a subject provided with an antireflection film effective for photographing a subject clearly as a result of preventing arising of halation caused by a stroboscope light.

BRIEF DESCRIPTION OF DRAWINGS

FIG. 2 is a perspective view showing a state of photographing a subject in the photographing booth assembled from the kit in FIG. 1.

FIG. 3 is a sectional view of FIG. 2.

EXEMPLARY MODE FOR CARRYING OUT THE DISCLOSED SUBJECT MATTER

Below, the best modes for carrying out the invention will be explained, however, the present invention is not limited to the modes below and also includes those obtained by suitably modifying or improving the modes explained below based on ordinary knowledge of persons skilled in the art within the scope of the present invention.

As to a range of value in the present specification, an upper limit value or a lower limit value described in certain value ranges may be replaced by values indicated in the examples.

In the present specification, when there are a plurality of kinds of substances falling under each component in a composition, a content ratio or a content in each component in the composition indicates a content ratio or a content of a total of the plurality of kinds of substances being in the composition unless otherwise mentioned.

(Photographing Booth Construction Kit)

Figure 1:
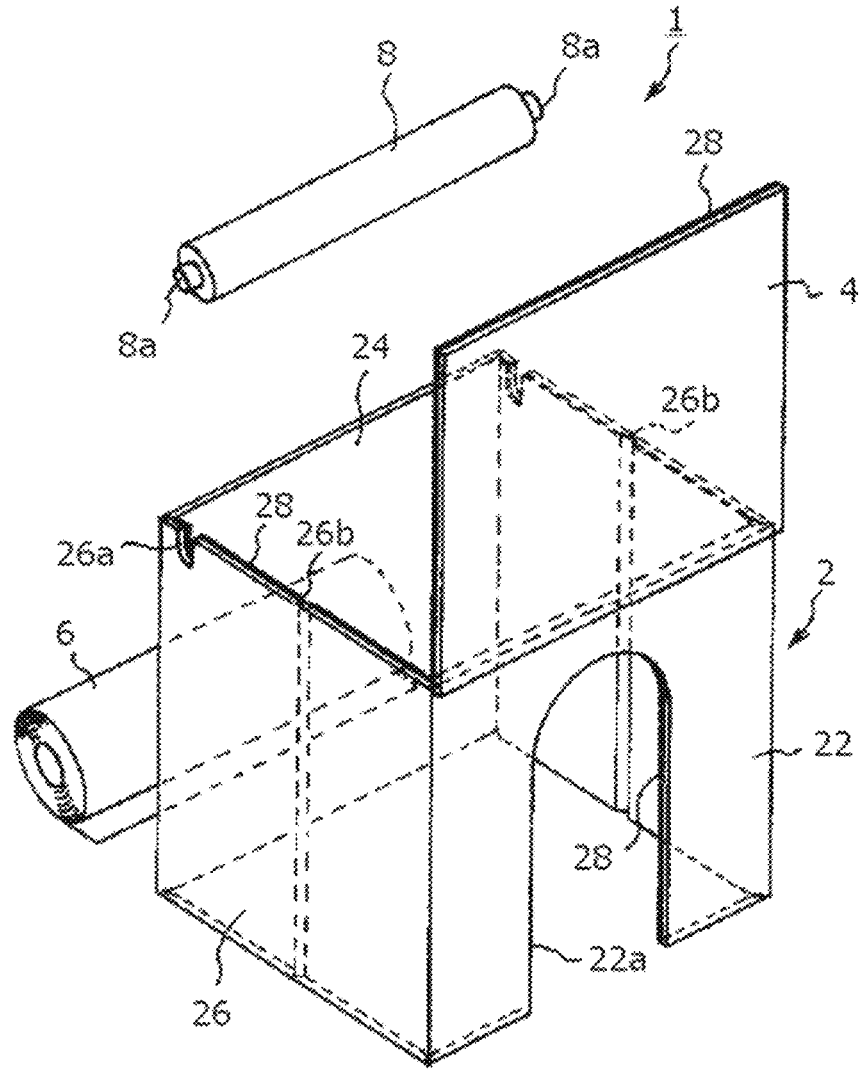
FIG. 1 is a disassembled perspective view showing a configuration example of a photographing booth construction kit according to one mode of the present invention.

As shown in FIG. 1 to FIG. 3, a photographing booth construction kit 1 according to one mode of the present invention (hereinafter, also simply referred to as "a kit 1") comprises as main components a box unit 2 in a foldable square cylindrical shape, a lid unit 4 in a rectangular flat plane shape, a rolled back sheet 6 to be laid as a background of a subject M to be photographed, and a roller 8 for the back sheet 6 to be placed thereover.

The lid unit 4 has a rectangular plane shape and configured that one side thereof is joined with a thin part of one side of an upper end (the upper opening side) of the box unit 2 so as to function as a ceiling part of the box unit 2 capable of opening and closing. When arranging a subject M in the box unit 2 in a state that the lid unit 4 is open (the upper opening part of the box unit 2 is exposed) and closing the lid unit 4 afterward, the photographing space in the box unit 2 becomes light-shielded.

The box unit 2 has a square cylindrical shape and comprises a front wall 22, rear wall 24 and side walls 26.

The front wall 22 has a photographing window 22a formed thereon. Thereby, the subject M arranged inside the box unit 2 is irradiated by a light 3 from outside and the subject M can be photographed with an image pickup device 5 (a digital camera, analog camera and video camera, etc.). The photographing window 22a may be configured to have an elliptic curved upper rim so as not to hinder photographing.

The upper part (on the rear wall 24 side) of each of the side walls 26 has a groove 26a for supporting a shaft unit 8a of the roller 8 and the roller 8 is attachable to and detachable from the shaft unit 8a. An intermediate part of the back sheet 6 fed from the rolled body, which is the back sheet 6 wound to be a roll (arranged outside of the box unit 2: Refer to FIG. 2 and FIG. 3), is placed over the roller 8 and as a result of feeding the back sheet 6 into the box unit 2, a curvature of a curved surface of the back sheet 6 can be changed easily.

The back sheet 6 has a thin body to be laid as a background of the subject M, and the detailed configuration of which will be explained later. An end of the fed back sheet 6 may be held down by the lower end (the lower opening side) of the box unit 2 as shown in FIG. 2. Alternatively, it may be held on the back surface of the front wall 22 by using a clip, etc. (not illustrated) or may be held down by the subject M.

Figure 4:
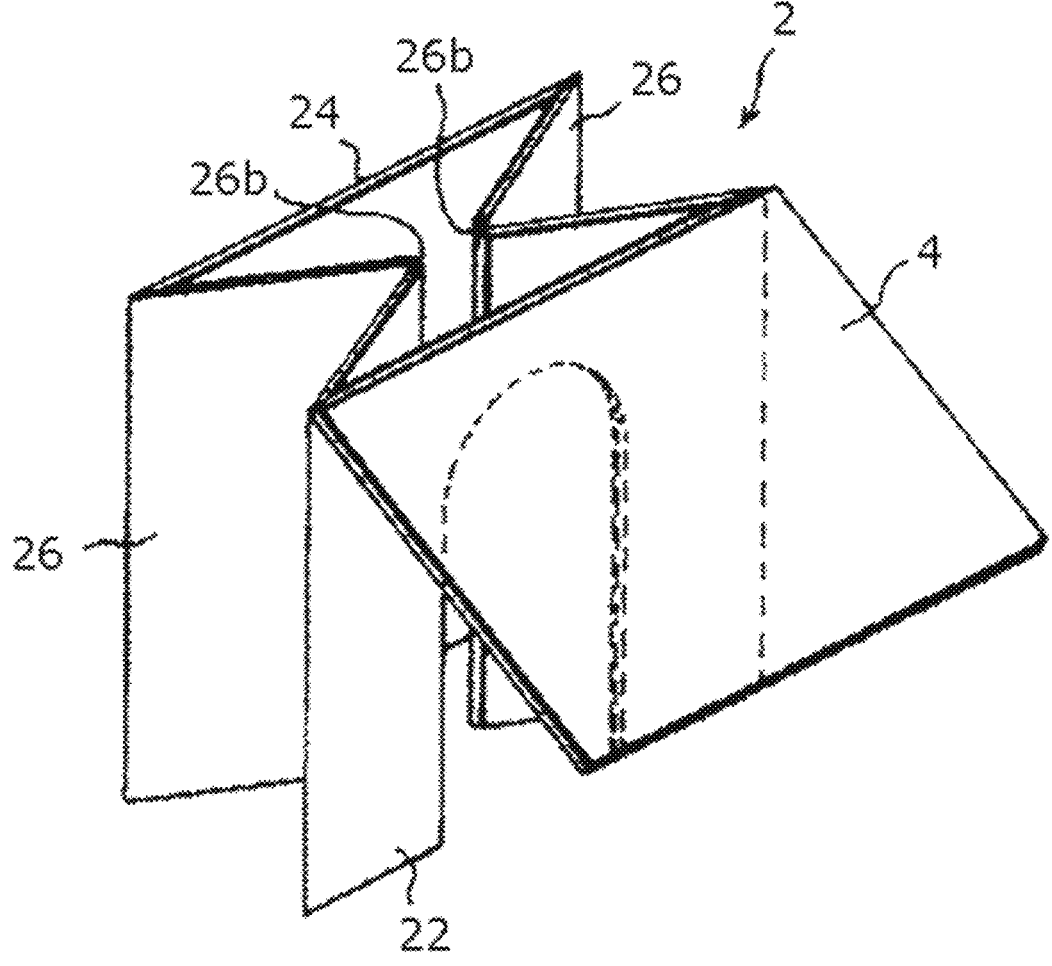
FIG. 4 is a perspective view showing a folding process of a part of the kit in FIG. 1.
Figure 5:
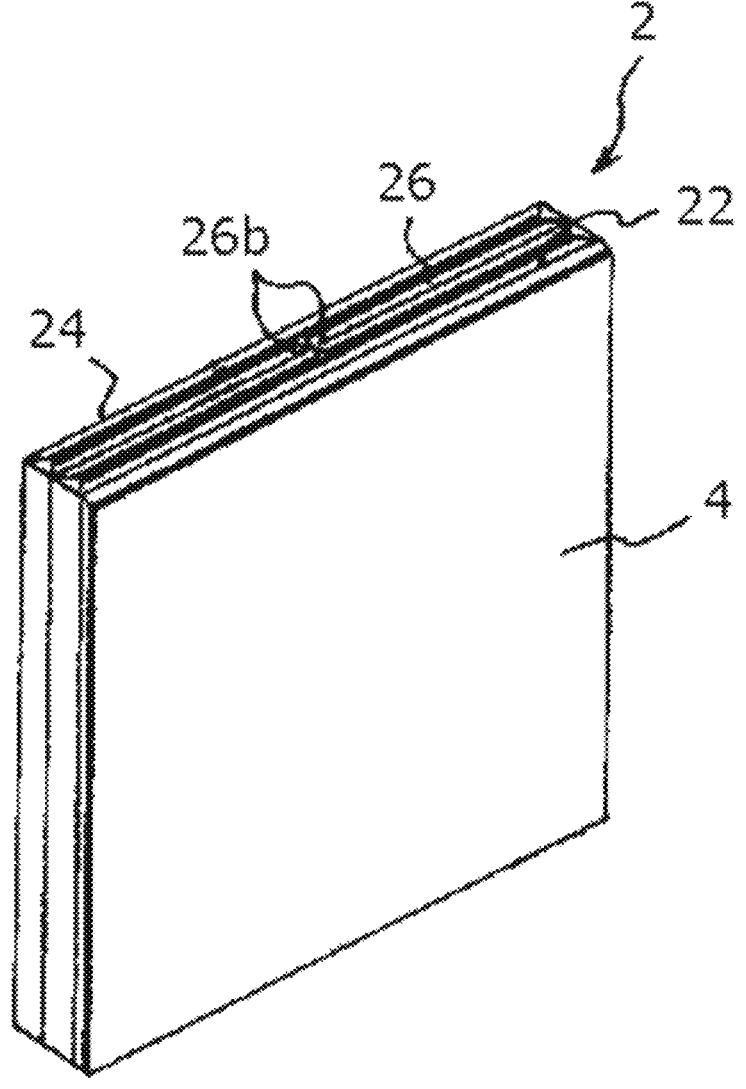
FIG. 5 is a perspective view showing a state where the part of the kit in FIG. 4 is folded completely.

At the center part of each of the sidewalls 26 has a thin part 26b cut in a V-shape as a folding part in the vertical direction and, as shown in FIG. 4, the sidewall 26 is configured to be able to be valley folded toward the inner side. Also, a corner part of the sidewalls 26 and rear wall 24 and a corner part of the sidewalls 26 and front wall 22 are made to be thin. Thereby, as shown in FIG. 5, it is configured that the front wall 22 and the rear wall 24 can be folded and put together, sandwiching the sidewalls 26.

The components (the front wall 22, rear wall 24 and sidewalls 26) of the box unit 2 and the lid unit 4 as explained above may be formed, for example, by a light-weight plastic material or may be formed by a thick paper or a wooden panel.

Note that each inner side of the front wall 22, rear wall 24, sidewalls 26 and lid unit 4 configuring the box unit 2 may be covered with an aluminum foil 28 having a high reflectance sticked thereto as a diffusion part. Also, the box unit 2 may be formed of a material having a high reflectance (styrene foam, etc.).

(Back Sheet)

Figure 6:
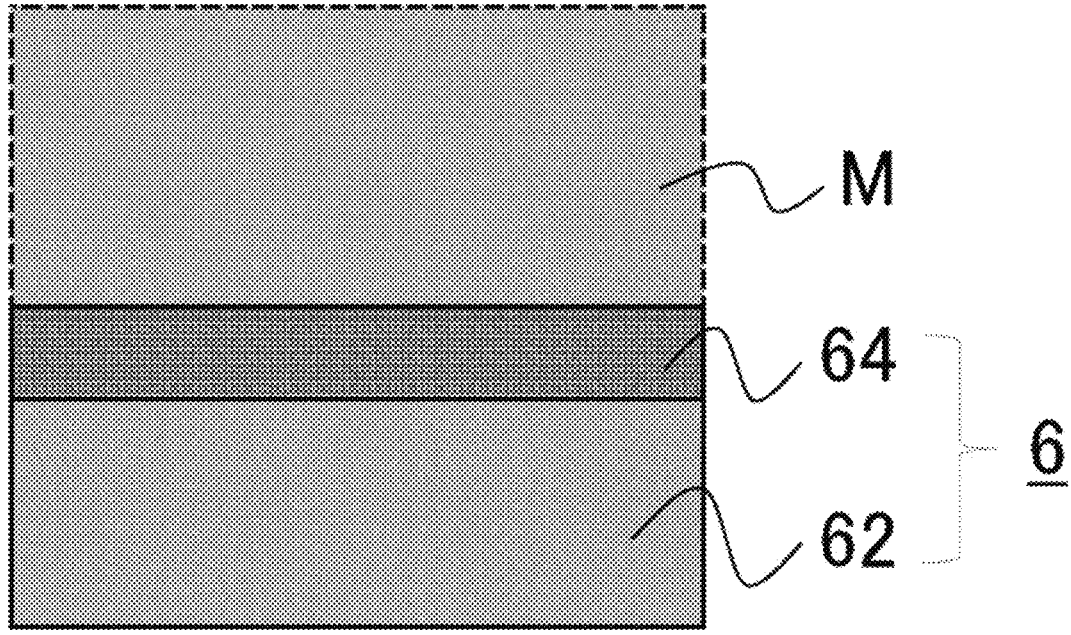
FIG. 6 is an enlarged sectional view of VI part in FIG. 3.

The back sheet 6 used in the kit 1 is, as shown in FIG. 6, configured by a sheet-shaped substrate 62 and a black antireflection film 64. The sheet-shaped substrate 62 may be preferably configured, for example, by a synthetic resin (polyolefin, polyester and polyamide, etc.), paper, cloth and unwoven cloth, etc. The sheet substrate may include a black pigment (carbon black and aniline black, etc.) mixed therein in advance.

When forming the sheet-shaped substrate 62 with a synthetic resin, it is preferable that one surface or both surfaces thereof is matte finished in accordance with need. Thereby, it is possible to improve the effect of preventing halation.

Matte finish may be performed, for example, by a chemical etching method, sand blast method, and a chemical matte method using a synthetic resin and roughening forming material, etc. A thickness of the sheet-shaped substrate 62 is not limited but, when forming the sheet-shaped substrate 62 with a synthetic resin, it is preferable that the thickness is, for example, 25 μm or more and 200 μm or less or so. In this case, when the thickness is less than 25 μm, there is a possibility that a sufficient antireflection effect cannot be brought out, while when exceeding 200 μm, it becomes disadvantageous in terms of reducing weight.

(Black Antireflection Film)

In the present example, a part or all of the main surface side of the sheet-shaped substrate 62 is provided with a black antireflection film 64. Since it is "on the main surface side", in addition to the mode of forming the antireflection film directly on the main surface of the sheet-shaped substrate, a mode of providing an optional layer (for example, a primer layer, etc.) between the sheet-shaped substrate 62 and the antireflection film 64 is included. Since it is "a part or all", a case of forming the antireflection film 64 on a part of the main surface side of the sheet-shaped substrate 62 is included.

The antireflection film 64 of the present example is configured by a membrane formed from a liquid composition.

<Liquid Composition>

A liquid composition according to one mode (hereinafter, also simply referred to as "a composition") is used for forming a membrane on the main surface side of the sheet-shaped substrate 62 (hereinafter, also simply referred to as "an object to be coated) and comprises (A) a resin component, (B) unevenness forming particles and (C) a diluent solvent. The (B) used for forming a composition comprises (B1) small particles having a particle diameter $(d_1)$ of 0.05 μm or more and 0.4 μm or less and (B2) large particles having a particle diameter $(d_2)$ of 2 μm or more and 6 μm or less, and it may also comprise components other than (B1) and (B2). Namely, a composition according to one mode is configured by comprising (A), (B1), (B2) and (C). A composition according to one mode may be used suitably by spray coating when applying to a surface of an object to be coated.

—(A)—

The (A) to be used for forming a composition serves as a binder of (B). A material of (A) is not particularly limited and either of a thermoplastic resin and thermosetting resin may be used. As a thermosetting resin, for example, an acrylic-type resin, urethane-type resin, phenol-type resin, melamine-type resin, urea-type resin, diallyl phthalate-type resin, unsaturated polyester-type resin, epoxy-type resin and alkyd-type resin, etc. may be mentioned. As a thermoplastic resin, a polyacrylic ester resin, polyvinyl chloride resin, butyral resin and styrene-butadiene copolymer resin, etc. may be mentioned. In terms of heat resistance, moisture resistance, solvent resistance and surface hardness of an uneven membrane to be formed, a thermosetting resin is preferably used as (A). As a thermosetting resin, when considering flexibility and strength of a membrane to be formed, an acrylic resin is particularly preferable. As (A), one kind may be used alone or two or more kinds may be combined for use.

A content (a total amount) of (A) is not particularly limited, however, when considering a blending balance with other components, it is preferably 5% by mass or more, more preferably 15% by mass or more, furthermore preferably 25% by mass or more and preferably 50% by mass or less, more preferably 45% by mass or less and furthermore preferably 40% by mass or less with respect to a total amount (100% by mass) of total solid content in the composition.

—(B)—

It is essential that the (B) to be used for forming a composition comprises a plurality of unevenness forming particles having different sizes in combination. Particularly, (B1) small particles and (B2) large particles are combined to be used as (B). For example, in the case of composing (B) only of two kinds of unevenness forming particles having different sizes (namely, (B1) and (B2)), a particle diameter $(d_2)$ of (B2) is preferably 10 times or more, more preferably 15 times or more a particle diameter $(d_1)$ of (B1) and preferably 40 times or less and more preferably 35 times or less. When using as (B) three or more kinds of unevenness forming particles having different sizes, a particle diameter $(d_{max})$ of unevenness forming particles with a maximum particle diameter and a particle diameter $(d_{min})$ of unevenness forming particles with a minimum particle diameter may be adjusted to have the relationship above (namely, $(d_{max})$ is preferably 10 times or more, more preferably 15 times or more the size of $(d_{min})$ and preferably 40 times or less and more preferably 35 times or less the size of $(d_{min})$).

In one mode, $(d_1)$ is preferably 0.05 μm or more, more preferably 0.1 μm or more and preferably 0.4 μm or less and more preferably 0.3 μm or less. $(d_2)$ is preferably 2 μm or more, more preferably 3 μm or more and preferably 6 μm or less, more preferably 5 μm or less and furthermore preferably 4 μm or less.

A particle diameter $(d_1)$ of (B1) and a particle diameter $(d_2)$ of (B2) are a median diameter based on volume measured by a laser diffraction/scattering particle size distribution measuring apparatus.

In one mode, a mass ratio of (B2) in (B) is, with respect to (B1):1, preferably more than 1.75, more preferably 1.8 or more and preferably less than 3.58 and more preferably 3.3 or less. The present inventors found that by using (B1) and (B2) having the specific ranges of particle diameters as explained above combined in a range of this mass ratio, one particle (B1) is easily buried between adjacent two particles (B2) in a membrane to be formed. As a result, low glossiness and low reflectivity on the membrane surface can be realized and a blackness degree can be increased (an L value becomes low).

A total content (total amount) of (B1) and (B2) in (B) is preferably 90% by mass or more and more preferably 95% by mass or more. An upper limit thereof is not particularly limited and is 100% by mass. Namely, in one mode, (B1) and (B2) may be contained preferably 90% by mass or more in 100% by mass of (B).

A content (total amount) of (B) with respect to a total amount (100% by mass) of a total solid content in the composition is preferably 20% by mass or more, more preferably 25% by mass or more, furthermore preferably 30% by mass or more and preferably 60% by mass or less, more preferably 50% by mass or less, furthermore preferably 45% by mass or less and particularly preferably 40% by mass or less. When a total amount of (B) is less than 20% by mass, disadvantages of an increase of glossiness and shortage of an optical density are caused, while when exceeds 60% by mass, (A) in a formed coating film is decreased relatively, which results in a disadvantage that a coating film falls off from an object to be coated in some cases.

As (B2), either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and carbon, etc. may be mentioned. They may be used alone or in combination of two or more kinds.

To obtain more excellent characteristics, it is preferable to use inorganic-type particles as (B2). By using inorganic-type particles as (B2), a lower glossy and highly light-shielding membrane can be formed easily. As inorganic-type particles to be used as (B2), silica is preferable. A shape of (B2) is not particularly limited but it is preferable to use particles having a narrow particle distribution (having a CV (Coefficient of Variation) value of, for example, 15 or less) (a sharp product) to realize furthermore lower glossiness, lower reflectance and a lower L value on a membrane surface to be formed. The CV value is a numerically expressed degree of spread of a particle diameter distribution (variation of particle diameters) with respect to an average value of a particle diameter (calculated average particle diameter). When using a particle as above, a chance of contacting between (B2) and (B1) increases in a membrane to be formed so as to realize furthermore lower glossiness, lower reflectance and a lower L value on the membrane surface easily.

Also, in order to decrease glossiness on the membrane surface to be formed, a particle in indefinite form is preferably used as (B2). It is particularly preferable to use a porous indefinite-shaped silica particle as (B2). When using particles as above as (B2), lights refract repeatedly on a surface and inside when formed into a membrane, consequently, a glossiness on the membrane surface can be furthermore reduced.

In one mode, in order to improve the effect of preventing reflection of lights (so-called halation) on a surface of a membrane to be formed, (B2) may be colored black by using an organic-type or inorganic-type colorant. As a material therefor, composite silica, conductive silica and black silica, etc. may be mentioned.

As composite silica, for example, what obtained by synthesizing carbon black (hereinafter, also simply referred to as "CB") and silica at a nano level and composing may be mentioned. As conductive silica, for example, what obtained by coating silica particles with conductive particles, such as CB, may be mentioned. As black silica, for example, natural ore containing graphite in silica may be mentioned.

As well as (B2), a material of (B1) is not particularly limited and either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and CB, etc. may be mentioned. They may be used alone or in combination of two or more kinds.

As (B1), for example, CB, etc. added as a colorant/conductive agent may be also used. When using CB as (B1), a membrane to be formed is colored, so that an effect of preventing reflection is increased furthermore and a preferable antistatic effect can be obtained.

—(C)—

The (C) used for forming a composition is contained for the purpose of dissolving (A) and adjusting viscosity of the whole composition. When using (C), (A) and other components to be added in accordance with need can be mixed more easily, and uniformity of the composition is improved. Also, viscosity of the composition can be adjusted properly, so that, when forming a membrane on a surface of an object to be coated, operability of the composition and uniformity of an application thickness can be improved.

As (C), it is not particularly limited as long as it is a solvent capable of dissolving (A), and an organic solvent or water may be mentioned. As an organic solvent, for example, methylethylketone, toluene, propylene glycol monomethyl ether acetate, ethyl acetate, butyl acetate, methanol, ethanol, isopropyl alcohol and butanol, etc. may be used. The (C) may be used alone or in combination of two or more kinds.

A content (total amount) of (C) in a composition is, with respect to 100 parts by mass of (A), preferably 1 part by mass or more, more preferably 3 parts by mass or more and preferably 20 parts by mass or less in order to obtain the effects of containing (C) as explained above.

—(D) Optional Component—

Other than the components ((A), (B) and (C)) above, the composition may contain (D) to an extent of not hindering the effects of the present invention. As (D), for example, a leveling agent, thickener, pH adjusting agent, lubricant, dispersant, defoaming agent, curing agent and reaction catalyst, etc. may be mentioned.

Particularly when using a thermosetting resin as (A), crosslinking of (A) can be accelerated by blending a curing agent. As a curing agent, a urea compound having a functional group, a melamine compound, isocyanate compound, epoxy compound, aziridine compound and oxazoline compound, etc. may be mentioned. As a curing agent, isocyanate compound is preferable among them. The curing agent may be used alone or in combination of two or more kinds.

A ratio of blending a curing agent in a composition is, with respect to 100 parts by mass of (A), preferably 10 parts by mass or more and 80 parts by mass or less. When adding a curing agent in this range, hardness of a membrane to be formed is enhanced, consequently, characteristics of the membrane surface can be maintained for a long term even when the membrane is exposed to an environment of rubbing against other member, and low glossiness, a high light-shielding characteristic, low reflectance and a high degree of blackness can be maintained easily.

When a curing agent is contained in a composition, a reaction catalyst may be used together so as to accelerate reaction of the curing agent with (A). As a reaction catalyst, for example, ammonia and aluminum chloride, etc. may be mentioned. A ratio of a reaction catalyst to be contained in the composition is, with respect to 100 parts by mass of a curing agent, preferably 0.1 part by mass or more and 10 parts by mass or less.

A composition according to one mode has viscosity at 25° C. of preferably 1 mPa·s or more, preferably 30 mPa·s or less and more preferably 20 mPa·s or less for the reason of coating by using a spray (spray coating) while maintaining smoothness of the composition on a surface of an object to be coated. When viscosity of the composition is too low, there is a possibility in some cases that a membrane having a thickness enough to realize sufficient effect of preventing arising of halation cannot be formed. When viscosity of the composition is too high, it becomes difficult to spray the composition uniformly on a surface of an object to be coated, so that there is a possibility that a membrane having a uniform thickness with little performance variation cannot be obtained in some cases.

The viscosity above differs depending on components contained in the composition, that is, kinds and molecular weights, etc. of (A) and (B) to be used. Also, when blending (D) in addition to the (A) and (B) above, it differs depending on a kind and molecular weight, etc. of (D), however, it can be adjusted easily by adjusting an amount of (C) in the composition in the range stated above.

A composition according to one mode of the present invention may be prepared (produced) by adding (A), (B) and, when needed, (D) to (C), and agitating to mix. An order of mixing the respective components is not particularly limited as long as the components are mixed uniformly.

A composition according to one mode of the present invention may be one-liquid type or two-liquid type. When containing a curing agent as (D) in the composition, the composition according to one mode may be two-liquid type with, for example, a first liquid comprising components other than a curing agent and a second liquid comprising the curing agent.

A method of forming a membrane is not particularly limited. A membrane may be formed on an object to be coated by any method or by any apparatus, for example, spray coating (for example, air spray, airless spray and electrostatic spray, etc.), paint brush, curtain flow coating, roller brush coating, bar coating, kiss roll, metaling bar, gravure roll, reverse roll, dip coating and die coating, etc. may be used.

Particularly, a composition according to one mode preferably forms a membrane by using spray coating, which requires spray of droplets from a small spray hole. In other words, a membrane according to one mode is formed from a liquid composition and is a spray coated membrane.

According to spray coating using a composition according to one mode, droplets of the composition adhere successively to a surface of an object to be coated and, at the same time, volatilization of (C) in the droplets adhered to the object to be coated proceeds. As a result, a solid content (particles) obtained by removing (C) from droplets laminates successively on the surface of the object to be coated so as to form a solid particle laminate. According to one mode, this solid particle laminate configures a membrane.

In the case of using a composition comprising a thermosetting resin as (A) and furthermore comprising a curable agent as (D), it is preferable that after a solid particle laminate is applied to a surface of an object to be coated, the laminate is heated to be cured. Here, even if a trace of (C) remains in the preheated laminate, it volatilizes almost completely by the heating.

Heating condition may be adjusted properly depending on a thickness of the preheat laminate, heat resistant characteristic of an object to be coated, and a kind of (C) to be used, etc. The heating condition is, for example, at 70° C. or more and 150° C. or less for one minute or more and 10 minutes or less, and preferably at 100° C. or more and 130° C. or less for 2 minutes or more and 5 minutes or less.

A thickness of the antireflection film 64 is not particularly limited as long as the strength in adhesiveness to the sheet-shaped substrate 62 is preferable and arising of halation can be prevented on a surface, on which the membrane is formed. To raise an example of a preferable film thickness, it is preferably 2 μm or more, more preferably 5 μm or more and preferably 40 μm or less and more preferably 25 μm or less.

Note that a thickness of the antireflection film 64 is a height including parts protruding, due to (B2) and (B1) in the membrane, from a surface of an object to be coated. The film thickness can be measured by a method based on JIS K7130.

<Characteristics of Membrane>

Characteristics of a membrane formed from a composition according to one mode are as below.

(Glossiness, Reflectance, L Value, Optical Density and Adhesiveness)

A membrane formed from a composition according to one mode preferably has 60°-glossiness of less than 1%, 85°-glossiness of less than 5%, reflectance of 4% or less, an L value of 22 or less and an optical density of 1.0 or more.

Here, when configured that a membrane formed from a composition according to one mode is exposed as an outermost surface, 60°-glossiness, 85°-glossiness, reflectance, an L value and optical density on the real surface of the membrane are preferably in the ranges as above. When another membrane is coated on a membrane formed from a composition according to one mode, 60°-glossiness, 85°-glossiness, reflectance, an L value and optical density on a surface of this another membrane (that is, an outermost surface of a back sheet 6) are preferably in the ranges as above. Hereinafter, these surfaces will be referred to as "an outermost surface of a membrane".

An outermost surface of a membrane formed from a composition according to one mode preferably has 60°-glossiness of less than 1%, 85°-glossiness of less than 5%, reflectance 4% or less, an L value 22 or less and an optical density 1.0 or more. When 60°-glossiness, 85°-glossiness, reflectance, an L value and optical density on an outermost surface of a membrane are in the ranges as above, it is possible to attain low glossiness, low reflectance (an excellent antireflection property: It will be the same below.), a high blackness degree and a high light-shielding characteristic on the outermost surface of the membrane.

The upper limit value of 60°-glossiness is more preferably less than 0.8% and furthermore preferably less than 0.5%. When 60°-glossiness is adjusted to be in the range above, it is possible to enjoy an advantage of enhancing an enchantment of a subject to be photographed when shooting from the front. A lower limit value of 60°-glossiness is not particularly limited, and the lower the better.

The upper limit value of 85°-glossiness is more preferably less than 3.5% and furthermore preferably less than 2.5%. When 85°-glossiness is adjusted to be in the range above, angle dependency is eliminated and it becomes easy to obtain an advantage of enhancing an enchantment of a subject to be photographed even when shooting from any angle. A lower limit value of 85°-glossiness is not particularly limited, and the lower the better.

An upper limit value of reflectance is more preferably 3% or less and furthermore preferably 2.5% or less. A lower limit value of reflectance is not particularly limited. The lower the reflectance is, the better. When reflectance is adjusted to be in the range above, it is possible to enjoy an advantage of enhancing an enchantment of a subject to be photographed (reflection is prevented so as to enhance an enchantment of a subject to be photographed).

An upper limit value of an L value (a blackness degree) is more preferably 20 or less and furthermore preferably 18 or less. A lower limit value of an L value is not particularly limited and the lower, the better in terms of photographing a subject clearly. When an L value is adjusted to be in the range above, blackness becomes high, blackness is enhanced and designability becomes excellent, therefore, superior appearance quality can be maintained.

The L value above is a lightness L*value on an outermost surface of a membrane, which is in CIE 1976 L*a*b* (CIELAB) color space system based on a SCE method. The SCE method is a specularly reflected light removal method, which means a method of measuring color by removing specularly reflected lights. Definition of the SCE method is defined in JIS Z8722 (2009). Since specularly reflected lights are removed in the SCE method, the color is close to the color actually viewed by human.

CIE is abbreviation of Commission Internationale de l'Eclairage, which means international committee on illumination. The CIELAB color space was adopted in 1976 in order to measure color difference between perception and devices and is a uniform color space defined in JIS Z 8781 (2013). Three coordinates in CIELAB are indicated by L*value, a*value and b*value. The L*value indicates lightness and expressed from 0 to 100. When L*value is 0, it indicates black, while it indicates white diffusion color when L*value is 100. The a*value indicates colors between red and green. When a*value is in minus, it indicates colors close to green, while when in plus, it indicates colors close to red. The b*value indicates colors between yellow and blue. When b*value is in minus, it indicates colors close to blue, while it indicates colors close to yellow when in plus.

A lower limit value of an optical density is more preferably 1.5 or more and furthermore preferably 2.0 or more. When an optical density is adjusted to be in the range above, a light-shielding characteristic can be improved furthermore. An upper limit value of an optical density is not particularly limited and the higher, the better.

The glossiness, reflectance, an L value and optical density explained above can be measured by methods explained later on.

In addition to the characteristics above (glossiness, reflectance, an L value and optical density), it is preferable that a membrane formed from a composition furthermore has good adhesiveness to a surface of an object to be coated. Adhesiveness of a membrane formed from a composition to a surface of an object to be coated is, as explained in adhesiveness evaluation in later-explained examples, that preferably 75% or more of the coating remain.

(Rz, Rsm, Rsk, Rku and Ra)

In a membrane formed from a composition according to one mode, it is preferable that a maximum height Rz is 7 μm or more, an average length Rsm of contour curve element is 80 μm or more, skewness Rsk of contour curve is 0.3 or less and Kurtosis Rku of a contour curve is 3 or more on its outermost surface of the membrane. When Rz, Rsm, Rsk and Rku on the outermost surface of the membrane are in the ranges above, glossiness, reflectance, an L value, and optical density on the outermost surface of a membrane can become in the ranges above (60°-glossiness of less than 1%, 85°-glossiness less than 5%, reflectance 4% or less, an L value 22 or less, and optical density 1.0 or more), consequently, low glossiness, low reflectance, high blackness degree and a high light-shielding characteristic on the outermost surface of a membrane can be attained.

The lower limit value of Rz is more preferably 10 μm or more. When the lower limit value of Rz is as above, low glossiness, low reflectance and a high light-shielding characteristic can be adjusted furthermore easily.

An upper limit value of Rz is not particularly limited but is preferably 50 μm or less and more preferably 30 μm or less. When an upper limit value of Rz is as above, furthermore lower glossiness, lower reflectance, a higher blackness degree and a higher light-shielding characteristic on the outermost surface of a membrane can be attained easily.

The Rsm indicates an average length of contour curve elements within the standard length. A lower limit value of Rsm is more preferably 100 μm or more and furthermore preferably 120 μm or more. When a lower limit value of Rsm is as above, an advantage of low glossiness can be attained furthermore easily. An upper limit value of Rsm is not particularly limited, but preferably 160 μm or less. In this range, furthermore excellent adhesiveness between an object to be coated and a membrane to be formed thereon can be obtained.

The Rsk is an average of the cubes of a height Z(x) in a dimentionless reference length obtained by a root mean square height (Zq) cubed, which is an index indicating deviation from an average line of uneven shape, that is, a degree of strain on an outermost surface of a membrane. There is a tendency that when Rsk value is in plus (Rsk>0), the uneven shape is deviated to the concave side, so that protruding shape becomes sharp. On the other hand, when in minus (Rsk<0), the uneven shape is deviated to the convex side, so that protruding shape becomes dull. When the protruding shape of contour curve is dull, haze becomes low comparing with the case with a sharp shape.

An upper limit value of Rsk is more preferably 0.2 or less. When an upper limit value of Rsk is as above, an advantage of low glossiness can be obtained furthermore easily. A lower limit value of Rsk is not particularly limited but is preferably 0 or more. When a lower limit value of Rsk is as above, an advantage of low glossiness can be obtained easily.

The Rku indicates an average of the fourth-power of a height Z(x) in a dimentionless reference length obtained by the four-power of a root-mean-square height (Zq), and is an index indicating a degree of sharpness at tips of unevenness on an outermost surface of a membrane. When Rku is larger, there are more sharp tips on unevenness, so that an inclined angle close to tips of unevenness becomes larger while inclined angles of other parts become smaller, so that a disadvantage of reflection on background tends to arise.

A lower limit value of Rku is more preferably 3.3 or more. When a lower limit value of Rku is as above, an advantage of low glossiness can be obtained furthermore easily. An upper limit value of Rku is not particularly limited, but is preferably 5 or less. When an upper limit value of Rku is as above, an advantage of low glossiness can be obtained easily.

In a membrane formed from a composition according to one mode, an arithmetic average roughness (Ra) on an outermost surface is preferably 0.5 μm or more, more preferably 1.0 μm or more and furthermore preferably 1.5 μm or more.

Those Rz, Rsm, Rsk, Rku and Ra on an outermost surface of a membrane as explained above can be measured or calculated based on JIS B0601:2001.

An antireflection film 64 according to one mode explained above may be formed directly on a main surface side of the sheet-shaped substrate 62 without any pretreatment or may be formed via a primer layer, however, it is not limited to these modes. For example, it may be a mode of preparing a sheet of an antireflection film obtained by forming an antireflection film 64 by spray coating on an extremely thin plastic film (PET film, etc.), cutting the sheet to fit a shape of the sheet-shaped substrate 62 so as to obtain a sheet piece, then, applying the sheet piece to the main surface side of the sheet-shaped substrate via an adhesive layer and, finally, forming an antireflection film 64.

(Booth Construction Method)

Next, a method for constructing a photographing booth by using the kit 1 above will be explained.

First, a folded box unit 2 as shown in FIG. 5 in the kit is back to a rectangular box state as shown in FIG. 1 by pushing the thin parts 26b on the sidewalls 26 toward the outside as shown in FIG. 4. Since the kit 1 can be folded to be carried to a photographing site, it has excellent mobility which is convenience.

Next, as shown in FIG. 2, a roller 8 is set at grooves 26*a*, a rolled back sheet 6 is placed over the roller 8, so that the antireflection film 64 faces outside (facing the subject M side to be photographed when fed out), and fed into the box unit 2 so as to build a background having a curved surface. Here, the subject M to be photographed is placed on the back sheet 6 and a lid unit 4 is closed, so that no light enters except from a photographing window 22*a*.

When a light is irradiated from a light 3 to the subject M through the photographing window 22*a*, the light reflects on aluminum foils 28 and becomes a diffusion light, consequently, a state where a shadow is hardly casted on the subject M, in other words, a uniform lighting effect can be attained. In this state, it is possible to photograph the subject M with an image pickup device 5.

By using the kit 1 according to one mode of the present invention, it is possible to easily construct a photographing booth effective to photograph a subject clearly. After photographing, when the roller 8 is removed and the box unit 2 is folded as shown in FIG. 5, the kit 1 does not need much storage space, as well.

Note that, in the example above, the box unit 2 was configured to be foldable as a result of forming a thin part 26*b* having a V-shaped cut as a folding part at the center of each of the sidewalls 26, however, it is not limited to this mode. The box unit 2 may be also configured to be not foldable by not forming the thin part 26*b* as a folding part at the center of each of the sidewalls 26.

EXAMPLES

Below, the present invention will be explained specifically based on experimental examples (including examples and comparative examples), however, the present invention is not limited to the experimental examples. Below, "part" indicates "part by mass" and "%" indicates "% by mass".

[Components of Composition]

As A (a resin component), a substance below was prepared.

A1: thermosetting acrylic resin (ACRYDIC A-801 produced by DIC, solid content 50%)

As B1 (small particles) falling under B (unevenness forming particles), substances below were prepared.

B1a: carbon black (CB) (particle diameter 150 nm)

(MHI Black_#273 produced by MIKUNI Color Ltd., CB content 9.5%)

B1b: transparent silica (particle diameter 58 nm)

(ACEMATT R972 produced by EVONIK)

As B2 (large particles) falling under B, substances below were prepared.

B2a: composite silica (particle diameter 3 μm)

(BECSIA ID produced by Fuji Silysia Chemical Ltd.)

B2b: black acrylic beads (particle diameter 3 μm)

(RUBCOULEUR 224SMD black produced by Dainichiseika Color & Chemicals Mfg Co., Ltd.)

B2c: transparent silica (particle diameter 4.1 μm)

(SYLYSIA 430 produced by Fuji Silysia Chemical Ltd.)

B2d: transparent silica (particle diameter 8 μm)

(SYLYSIA 450 produced by Fuji Silysia Chemical Ltd.)

B2e: transparent acrylic beads (particle diameter 3 μm)

(ENEOS Uni-Powder NMB-0320C produced by ENEOS Corporation)

Note that BECSIA ID used as B2a (composite silica) is composite particles of CB and silica, wherein CB/silica=about 25/75 (mass ratio). The MHI black #273 used as B1a (CB) is a CB dispersant and, in a solid content total amount 18% of the dispersant, 9.5% is CB and remaining 8.5% is other compounds. In the 8.5% of remaining compounds, 3% is a copper compound and 5.5% is an acrylic resin.

As D (optional component), a substance below was prepared.

D1: isocyanate compound (TAKENATE D110N produced by Mitsui Chemicals, Inc., solid content 75%)

[Object to be Coated]

As an object to be coated, sample substrates for evaluation were prepared. As a sample substrate for evaluation, a black polycarbonate sheet material was used and rectangular-shaped polycarbonate plates (100 mm in the longitudinal length, 50 mm in width and 1.5 mm in thickness) produced to be matte finish on both surfaces of the plate in the thickness (X) direction were used.

Experimental Examples 1 to 17

1. Preparation of Composition

Respective components for each experimental example with each solid content ratio shown in Table 1 were prepared, so that a total solid content becomes approximately 25% by mass, and added to a necessary amount of (C) a diluent solvent, which is a mixed solvent (methylethyl ketone:butyl acetate=50:50), and agitated to mix, and a liquid composition (hereinafter, also simply referred to as "a liquid") was prepared.

2. Production of Sample for Evaluation

Each liquid obtained for each of the experimental examples was sprayed toward one surface of an object to be coated by spray coating in the same method as explained in (3-1) Coating Performance below. Then, the resultant was heated at 120° C. for 3 minutes to dry, a solid particle laminate was formed by spray coating and heated to be a coating (hereinafter, also simply referred to as "a coating") having an average membrane thickness of 20 μm on a surface of the object to be coated, so that a sample for evaluation was obtained.

3. Evaluation

On each liquid obtained in each of the experimental examples, a variety of characteristics (coating performance) were evaluated in the methods explained below (liquid evaluation). Also, a coating formed on each sample for evaluation obtained in each of the experimental examples was evaluated on a variety of characteristics (characteristics and surface properties) (sample evaluation). The results are shown in Table 1.

[Liquid Evaluation]

(3-1) Coating Performance

Coating performance of a liquid was evaluated by observing coating uniformity after coating by spray coating.

An air spray configured by attaching an air brush (Spray-Work HG Single Airbrush produced by TAMIYA, Inc.) to an air can (Spray-Work Air Can 420D produced by TAMIYA, Inc.) was prepared and each liquid was poured into it. Then, the liquid was sprayed toward an outer surface of an object to be coated for 10 seconds from a 10 cm distance from a tip of the air brush, and a formed solid particle laminate was evaluated on its coating uniformity visually. Evaluation reference is as below.

◯: Lack of coating uniformity (lack of uniformity in thickness) was not observed.

Δ: Lack of coating uniformity was observed partially.

X: Lack of coating uniformity was observed in many areas.

[Sample Evaluation]

(3-2) Characteristics

—Glossiness—

Glossiness against a measurement light having an incident angle of 60° (specular glossiness at) 60° and a measurement light having an incident angle of 85° (specular glossiness at) 85° on a surface of a coating formed on each sample for evaluation were measured on 9 spots by using a glossmeter (VG 7000 produced by NIPPON DENSHOKU Industries Co., Ltd.) by the method based on JIS Z8741, and an average value thereof was adopted as a glossiness degree. Evaluation reference is as below.

(60°-Specular Glossiness)

⊚: less than 0.8% (very excellent)

○: 0.8% or more but less than 1% (excellent)

X: 1% or more (insufficient)

(85°-Specular Glossiness)

⊚: less than 3.5% (very excellent)

○: 3.5% or more but less than 5% (excellent)

X: 5% or more (insufficient)

(Comprehensive Evaluation of Glossiness)

⊚: The respective evaluations on 60°-specular glossiness and 85°-specular glossiness were all ⊚. (extremely preferable glossiness)

○: At least one of the respective evaluations on 60°-specular glossiness and 85°-specular glossiness was ○ and none of them was X. (preferable glossiness)

X: At least one of the respective evaluations on 60°-specular glossiness and 85°-specular glossiness was X. (not low enough glossiness)

—Reflectance—

Reflectance against lights having a wavelength of 400 nm to 700 nm on a surface of a coating formed on each of the samples for evaluation was measured at 9 spots at an interval of 1 nm by using a spectral colorimeter (CM-5 produced by Konica Minolta Inc.) by the method based on JIS Z8722, and an average value of the measurement results was adopted as reflectance. Evaluation reference is as below.

⊚: Reflectance was 3% or less. (extremely preferable low reflectivity)

○: Reflectance exceeded 3% but 4% or less. (preferable low reflectivity)

X: Reflectance exceeded 4%. (not low enough reflectivity)

—Blackness Degree—

A degree of blackness on a surface of a coating formed on each sample for evaluation was evaluated by measuring lightness L*value in CIE 1976 L*a*b* (CIELAB) color space system on the surface of the coating by the SCE method. The lightness L*value was measured by using a spectral colorimeter (CM-5 produced by Konica Minolta Inc.) by the method based on JIS Z8781-4:2013. Evaluation reference is as below.

When measuring, a CIE standard light source D65 was used as a light source and L* value in the CIELAB color space system was obtained at a viewing angle of 10° by the SCE method. The CIE standard light source D65 is defined in JIS Z8720 (2000) "Standard Illuminants and Sources for Colorimetry", and ISO 10526 (2007) also shows the same definition. The CIE standard light source D65 is used in the case of displaying colors of an object illuminated by daylight. A viewing angle of 10° is defined in JIS Z8723 (2009) "Methods of Visual Comparison for Surface Colours", and ISO/DIS 3668 also shows the same definition.

⊚: An L value was 20 or less. (extremely high degree of blackness)

○: An L value exceeded 20 but 22 or less. (high degree of blackness)

X: An L value exceeded 22. (insufficient degree of blackness)

—Light-Shielding Characteristic—

A light-shielding characteristic of a coating formed on each of the samples for evaluation was evaluated by calculating an optical density of the coating. An optical density of a coating formed on each of the samples for evaluation was obtained by using an optical density meter (X-rite 361T (ortho filter) produced by Nihon Heihan Kizai Kabushiki Kaisha), irradiating a vertical transmission light flux to the coated film side of a sample and calculating by expressing a ratio with respect to a state without a coating film in log (logarithms). An optical density of 6.0 or more is an upper limit value of detection in the measurement. Evaluation reference is as below.

⊚: An optical density was 1.5 or more. (extremely preferable light-shielding characteristic)

○: An optical density was 1.0 or more but less than 1.5 (preferable light-shielding characteristic)

X: Optical density was less than 1.0. (insufficient light-shielding characteristic)

—Adhesiveness—

Adhesiveness of a coating film formed on each sample for evaluation to a surface of an object to be coated was evaluated by cutting the coating film in a grid pattern with a market-available cutter, putting thereon a cellophane tape (Cellulose tape produced by NICHIBAN Co., Ltd.), then taking off the tape, and visually observing a remaining state of the coating film. Evaluation reference is as below.

⊚: A coating film remained 100%. (extremely high adhesiveness)

○: A coating film remained 75% or more and less than 100%. (high adhesiveness)

X: A coating film remained less than 75%. (insufficient adhesiveness)

—Comprehensive Evaluation—

Glossiness, reflectance, a blackness degree, a light-shielding characteristic and adhesiveness as above were evaluated comprehensively. Evaluation reference is as below.

⊚: Evaluations on glossiness, reflectance, a blackness degree, a light-shielding characteristic and adhesiveness were all ⊚.

○: At least one of the evaluations on glossiness, reflectance, a blackness degree, a light-shielding characteristic and adhesiveness was ○, and there was no X.

X: At least one of the evaluations on glossiness, reflectance, a blackness degree, a light-shielding characteristic and adhesiveness was X.

(3-3) Surface Properties

—Rz Value, Rsm Value, Rsk Value, Rku Value and Ra Value—

Properties (Rz value, Rsm value, Rsk value, Rku value and Ra value) of a surface of a coating film formed on each sample for evaluation were measured by using a surface roughness measuring device (SURFCOM 480B produced by TOKYO SEIMITSU Co., Ltd.) by a method based on JIS B0601:2001. Evaluation references are as below.

(Rz)

⊚: Rz was 10 μm or more. (extremely preferable)

○: Rz was 7 μm or more but less than 10 μm. (preferable)

X: Rz was less than 7 μm. (defective)

(Rsm)

⊚: Rsm was 120 μm or more. (extremely preferable)

○: Rsm was 80 μm or more but less than 120 μm. (preferable)

X: Rsm was less than 80 μm. (defective)

(Rsk)

⊚: Rsk was 0.2 or less. (extremely preferable)

○: Rks exceeded 0.2 but 0.3 or less. (preferable)

X: Rsk exceeded 0.3. (defective)

(Rku)

⊚: Rku was 3.3 or more. (extremely preferable)

○: Rku was 3 or more but less than 3.3. (preferable)

X: Rku was less than 3. (defective)

(Ra)

⊚: Ra was 1.5 μm or more. (extremely preferable)

○: Ra was 0.5 μm or more but less than 1.5 μm. (preferable)

X: Ra was less than 0.5 μm. (defective)

TABLE 1

| | COMPONENTS | | | | EXPERIMENTAL EXAMPLES | | | | | | | | |
| | | | | | 1 | 2 | 3 | 4 | 5 | 6 | 7 | 8 | 9 |
|---|---|---|---|---|---|---|---|---|---|---|---|---|---|
| LIQUID COMPOSITION | A | A1 | | ACRYLIC RESIN | 60 | 60 | 60 | 60 | 60 | 60 | 60 | 60 | 60 |
| | D | D1 | | ISOCYANATE COMPOUND | 40 | 40 | 40 | 40 | 40 | 40 | 40 | 40 | 40 |
| | B | B1 | B1a | CARBON BLACK (150 nm) | 20.0 | 19.0 | 15.0 | 13.0 | 12.0 | 15.0 | 15.0 | 15.0 | 15.0 |
| | | | B1b | TRANSPARENT SILICA (58 nm) | — | — | — | — | — | — | — | — | — |
| | | B2 | B2a | COMPOSITE SILICA (3 μm) | 35.0 | 36.0 | 40.0 | 42.0 | 43.0 | — | — | — | — |
| | | | B2b | BLACK ACRYLIC BEADS (3 μm) | — | — | — | — | — | 40.0 | — | — | — |
| | | | B2c | TRANSPARENT SILICA (4.1 μm) | — | — | — | — | — | — | — | 40.0 | — |
| | | | B2d | TRANSPARENT SILICA (8 μm) | — | — | — | — | — | — | 40.0 | — | — |
| | | | B2e | TRANSPARENT ACRYLIC BEADS (3 μm) | — | — | — | — | — | — | — | — | 40.0 |
| | ※B1:B2 = 1:● (MASS RATIO) | | | | 1.75 | 1.89 | 2.67 | 3.23 | 3.58 | — | — | — | — |
| | ※(A + B + D):B = 100:● (MASS RATIO) | | | | 35.5 | 35.5 | 35.5 | 35.5 | 35.5 | 35.5 | 35.5 | 35.5 | 35.5 |
| EVALUATION ON CHARACTERISTICS | LIQUID | | | COATING PERFORMANCE | ○ | ○ | ○ | ○ | ○ | ○ | ○ | ○ | ○ |
| | MEMBRANE CHARACTERISTICS | | | GLOSSINESS (60°-SPECULAR GLOSSINESS) | ○ | ○ | ◎ | ◎ | ◎ | ○ | ○ | ○ | ◎ |
| | | | | GLOSSINESS (85°-SPECULAR GLOSSINESS) | ○ | ○ | ◎ | ◎ | ◎ | ○ | ○ | ◎ | ◎ |
| | | | | COMPREHENSIVE GLOSSINESS | ○ | ○ | ◎ | ◎ | ◎ | ○ | ○ | ○ | ○ |
| | | | | REFLECTANCE (ANTIREFLECTION CHARACTERISTIC) | × | ○ | ◎ | ◎ | ◎ | × | × | ○ | ○ |
| | | | | L VALUE (L*VALUE IN CIELAB COLOR SPACE SYSTEM) | ◎ | ◎ | ◎ | ○ | ○ | ○ | ○ | ◎ | ○ |
| | | | | LIGHT-SHIELDING CHARACTERISTIC | × | ○ | ◎ | ○ | ◎ | × | × | ◎ | × |
| | | | | ADHESIVENESS | ◎ | ◎ | ◎ | ◎ | ◎ | × | ◎ | ◎ | × |
| | | | | ※COMPREHENSIVE EVALUATION ON MEMBRANE CHARACTERISTICS | × | ○ | ◎ | ◎ | ◎ | × | × | ○ | × |
| | MEMBRANE PROPERTY | | | Rz | × | ○ | ◎ | ◎ | ◎ | ○ | ○ | ○ | ○ |
| | | | | Rsm | ○ | ○ | ◎ | ◎ | ○ | ○ | ○ | ○ | ○ |
| | | | | Rsk | × | ◎ | ◎ | ◎ | ○ | ○ | ○ | ○ | ○ |
| | | | | Rku | ◎ | ○ | ◎ | ◎ | ◎ | ○ | ○ | ○ | ○ |
| | | | | Ra | ○ | ○ | ◎ | ◎ | ◎ | ○ | ○ | ○ | ○ |

TABLE 1-continued

| | | | | EXPERIMENTAL EXAMPLES | | | | | | | | |
| | | | | 10 | 11 | 12 | 13 | 14 | 3 | 15 | 16 | 17 |
|---|---|---|---|---|---|---|---|---|---|---|---|---|
| LIQUID COMPOSITION | A | A1 | | ACRYLIC RESIN | 60 | 60 | 60 | 60 | 60 | 60 | 60 | 60 | 60 |
| | D | D1 | | ISOCYANATE COMPOUND | 40 | 40 | 40 | 40 | 40 | 40 | 40 | 40 | 40 |
| | B | B1 | B1a | CARBON BLACK (150 nm) | — | 15.0 | — | 5.0 | 10.0 | 15.0 | 25.0 | 35.0 | 45.0 |
| | | | B1b | TRANSPARENT SILICA (58 nm) | 15.0 | 40.0 | 15.0 | — | — | — | — | — | — |
| | | B2 | B2a | COMPOSITE SILICA (3 μm) | 40.0 | — | 40.0 | 16.0 | 19.0 | 40.0 | 62.0 | 80.0 | 120.0 |
| | | | B2b | BLACK ACRYLIC BEADS (3 μm) | — | — | — | — | — | — | — | — | — |
| | | | B2c | TRANSPARENT SILICA (4.1 μm) | — | — | — | — | — | — | — | — | — |
| | | | B2d | TRANSPARENT SILICA (8 μm) | — | — | — | — | — | — | — | — | — |
| | | | B2e | TRANSPARENT ACRYLIC BEADS (3 μm) | — | — | — | — | — | — | — | — | — |
| | ※B1:B2 = 1:● (MASS RATIO) | | | | 35.5 | 35.5 | 35.5 | 3.20 | 1.90 | 2.67 | 2.48 | 2.29 | 2.67 |
| | ※(A + B + D):B = 100:● (MASS RATIO) | | | | 35.5 | 35.5 | 35.5 | 17.4 | 22.5 | 35.5 | 46.5 | 53.5 | 62.3 |
| EVALUATION ON CHARACTERISTICS | LIQUID | | | COATING PERFORMANCE | ○ | ○ | ○ | ○ | ○ | ○ | ○ | ○ | ○ |
| | MEMBRANE CHARACTERISTICS | | | GLOSSINESS (60°-SPECULAR GLOSSINESS) | ○ | × | ○ | × | ○ | ◎ | ○ | ○ | ○ |
| | | | | GLOSSINESS (85°-SPECULAR GLOSSINESS) | ○ | × | ○ | × | ○ | ◎ | ◎ | ◎ | ○ |
| | | | | COMPREHENSIVE GLOSSINESS | ○ | × | ○ | × | ○ | ◎ | ◎ | ○ | ○ |
| | | | | REFLECTANCE (ANTIREFLECTION CHARACTERISTIC) | ◎ | × | × | × | ○ | ◎ | ◎ | ○ | ○ |
| | | | | L VALUE (L*VALUE IN CIELAB COLOR SPACE SYSTEM) | ◎ | ○ | ○ | ◎ | ◎ | ◎ | ◎ | ◎ | ○ |
| | | | | LIGHT-SHIELDING CHARACTERISTIC | ○ | × | × | × | ○ | ◎ | ◎ | ○ | × |
| | | | | ADHESIVENESS | ◎ | × | × | × | ◎ | ◎ | ◎ | ◎ | × |
| | | | | ※COMPREHENSIVE EVALUATION ON MEMBRANE CHARACTERISTICS | ○ | × | ○ | × | ○ | ◎ | ◎ | ○ | ○ |
| | MEMBRANE PROPERTY | | | Rz | ○ | × | × | × | ○ | ◎ | ◎ | ◎ | ◎ |
| | | | | Rsm | ○ | × | × | × | ○ | ◎ | ◎ | ○ | ○ |
| | | | | Rsk | ○ | × | × | × | ○ | ◎ | ◎ | ○ | ○ |
| | | | | Rku | ○ | × | ○ | × | ○ | ◎ | ◎ | ◎ | ○ |
| | | | | Ra | ○ | × | ○ | × | ○ | ◎ | ◎ | ○ | ◎ |

4. Consideration

As shown in Table 1, when a liquid for forming a membrane did not comprise as (B) one or more of (B1) and (B2) (Experimental Examples 6, 7, 9, 11 and 12), at least one of the membrane characteristics of glossiness, reflectance, an L value, a light-shielding characteristic and adhesiveness was not satisfied. On the other hand, even both of (B1) and (B2) were contained as (B) in the liquid (Experimental Examples 1 to 5, 8 and 10), when a mass ratio of (B2) with respect to (B1):1 was 1.75 or less (Experimental Example 1) or 3.58 or more (Experimental Example 5), one or more of an L value and adhesiveness of the membrane characteristics was not satisfied. Even if both of (B1) and (B2) were contained and a mass ratio of (B2) with respect to (B1):1 was in a proper range (exceeding 1.75 and less than 3.58) (Experimental Examples 2 to 4 and 13 to 17), when a content (total amount) of (B) in 100% by mass of a total solid content was less than 20% by mass (Experimental Example 13) or exceeding 60% by mass (Experimental Example 17), one or more of glossiness, reflectance, an L value, a light-shielding characteristic and adhesiveness of the membrane characteristics was not satisfied.

On the other hand, when a mass ratio range of (B2) with respect to (B1):1 exceeded 1.75 and less than 3.58 and a total content of (B) with respect to a total solid amount of 100% by mass in a composition was 20% by mass or more and 60% by mass or less (Experimental Examples 2 to 4, 8, 10 and 14 to 16), all of the coating performance of the liquid, membrane characteristics and membrane properties were satisfied.

| DESCRIPTION OF NUMERICAL NOTATIONS | |
| --- | --- |
| 1 | photographing booth construction kit |
| 2 | box unit |
| 22 | front wall |
| 22a | photographing window |
| 24 | rear wall |
| 26 | side wall |
| 26a | groove |
| 26b | thin part (folding part) |
| 28 | aluminum foil |
| 4 | lid unit |
| 6 | back sheet |
| 62 | sheet-shaped substrate |
| 64 | antireflection film |
| 8 | roller |
| 8a | shaft unit |
| 3 | light |
| 5 | image pickup device |
| M | subject to be photographed |

The invention claimed is:

1. A kit for constructing a photographing booth used for photographing a subject to be photographed, comprising at least a back sheet arranged as a background of the subject to be photographed in a photographing space, wherein the back sheet has a black antireflection film on a main surface side, which faces the subject to be photographed;

the antireflection film is configured by a membrane having a thickness equal to or greater than 2 μm and less than or equal to 40 μm formed from a liquid composition by spray coating;

the liquid composition comprises at least (A), (B) and (C); wherein:

(A) is a resin compound;

(B) is either resin-type particles or inorganic-type particles, (B) is contained in an amount equal to or greater than 20% by mass and less than or equal to 60% by mass in a total amount of 100% by mass of all solid content in the composition;

(B) comprises (B1) and (B2) in an amount, wherein a total amount of (B1) and (B2) in 100% by mass of (B) is equal to or great than 90% by mass, and a mass ratio of (B2) with respect to (B1 is equal to or greater than 1.8 and less than or equal to 3.3;

(B1) is inorganic-type small particles having a particle diameter ($d_1$) equal to or greater than 0.05 μm and less than or equal to 0.4 μm;

(B2) is inorganic-type large particles having a particle diameter ($d_2$) equal to or greater than 2 μm and less than or equal to 6 μm; and (C) is a diluent solvent.

2. The kit according to claim 1, wherein (B2) comprises silica.

3. The kit according to claim 2, wherein silica includes complex silica colored black with a colorant.

4. The kit according to claim 3, wherein (B1) comprises carbon black.

5. The kit according to claim 3, wherein an outermost surface of a plane formed with a membrane has glossiness of less than 1% against an incident light with an incident angle of 60°, glossiness of less than 5% against an incident light with an incident angle of 85°, reflectance of 4% or less against a light having a wavelength of 550 nm, an L value in CIELAB color space system by SCE method of 22 or less and an optical density of 1.0 or more.

6. The kit according to claim 5, wherein, on an outermost surface of a plane formed with a membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

7. The kit according to claim 3, furthermore comprising a box unit having a square cylindrical shape configured by a front wall, a rear wall and both sidewalls and able to be folded, a lid unit having a rectangular flat plane, wherein a thin part of one side thereof is joined with a thin part of one side of an upper end of the box unit capable of opening and closing as a ceiling part of the box unit, and an attachable/detachable roller arranged at upper ends of both sidewalls of the box unit; wherein by placing over the roller an intermediate part of the back sheet fed from a rolled body, which is the back sheet wound to be a roll, and feeding the back sheet into the box unit, a photographing space can be formed inside the box unit.

8. The kit according to claim 2, wherein (B1) comprises carbon black.

9. The kit according to claim 2, wherein an outermost surface of a plane formed with a membrane has glossiness of less than 1% against an incident light with an incident angle of 60°, glossiness of less than 5% against an incident light with an incident angle of 85°, reflectance of 4% or less against a light having a wavelength of 550 nm, an L value in CIELAB color space system by SCE method of 22 or less and an optical density of 1.0 or more.

10. The kit according to claim 9, wherein, on an outermost surface of a plane formed with a membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

11. The kit according to claim 2, furthermore comprising a box unit having a square cylindrical shape configured by a front wall, a rear wall and both sidewalls and able to be folded, a lid unit having a rectangular flat plane, wherein a thin part of one side thereof is joined with a thin part of one side of an upper end of the box unit capable of opening and closing as a ceiling part of the box unit, and an attachable/detachable roller arranged at upper ends of both sidewalls of the box unit; wherein by placing over the roller an intermediate part of the back sheet fed from a rolled body, which is the back sheet wound to be a roll, and feeding the back sheet into the box unit, a photographing space can be formed inside the box unit.

12. The kit according to claim 1, wherein (B1) comprises carbon black.

13. The kit according to claim 12, wherein an outermost surface of a plane formed with a membrane has glossiness of less than 1% against an incident light with an incident angle of 60°, glossiness of less than 5% against an incident light with an incident angle of 85°, reflectance of 4% or less against a light having a wavelength of 550 nm, an L value in CIELAB color space system by SCE method of 22 or less and an optical density of 1.0 or more.

14. The kit according to claim 13, wherein, on an outermost surface of a plane formed with a membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

15. The kit according to claim 12, furthermore comprising a box unit having a square cylindrical shape configured by a front wall, a rear wall and both sidewalls and able to be folded, a lid unit having a rectangular flat plane, wherein a thin part of one side thereof is joined with a thin part of one side of an upper end of the box unit capable of opening and closing as a ceiling part of the box unit, and an attachable/detachable roller arranged at upper ends of both sidewalls of the box unit; wherein by placing over the roller an intermediate part of the back sheet fed from a rolled body, which is the back sheet wound to be a roll, and feeding the back sheet into the box unit, a photographing space can be formed inside the box unit.

16. The kit according to claim 1, wherein an outermost surface of a plane, on which a membrane is formed, has glossiness of less than 1% against an incident light with an incident angle of 60°, glossiness of less than 5% against an incident light with an incident angle of 85°, reflectance of 4% or less against a light having a wavelength of 550 nm, an L value of 22 or less in CIELAB color space system by SCE method and an optical density of 1.0 or more.

17. The kit according to claim 16, wherein, on an outermost surface of a plane formed with a membrane, a maximum height Rz based on JIS B0601:2001 is 7 μm or more, an average length Rsm of contour curve elements is 80 μm or more, a skewness Rsk of a contour curve is 0.3 or less, and Kurtosis Rku of a contour curve is 3 or more.

18. The kit according to claim 16, furthermore comprising a box unit having a square cylindrical shape configured by a front wall, a rear wall and both sidewalls and able to be folded, a lid unit having a rectangular flat plane, wherein a thin part of one side thereof is joined with a thin part of one side of an upper end of the box unit capable of opening and closing as a ceiling part of the box unit, and an attachable/detachable roller arranged at upper ends of both sidewalls of the box unit; wherein by placing over the roller an intermediate part of the back sheet fed from a rolled body, which is the back sheet wound to be a roll, and feeding the back sheet into the box unit, a photographing space can be formed inside the box unit.

19. The kit according to claim 1, furthermore comprising a box unit having a square cylindrical shape configured by a front wall, a rear wall and both sidewalls and able to be folded, a lid unit having a rectangular flat plane, wherein a thin part of one side thereof is joined with a thin part of one side of an upper end of the box unit capable of opening and closing as a ceiling part of the box unit, and an attachable/detachable roller arranged at upper ends of both sidewalls of the box unit; wherein by placing over the roller an intermediate part of the back sheet fed from a rolled body, which is the back sheet wound to be a roll, and feeding the back sheet into the box unit, a photographing space can be formed inside the box unit.

20. A black antireflection film, formed on a back sheet arranged as a background of a subject to be photographed in a photographing space of a kit for constructing a photographing booth used for photographing a subject to be photographed, configured by a membrane having a thickness greater than or equal to 2 μm and less than or equal to 40 μm formed from a liquid composition by spray coating:

wherein the liquid composition comprises at least (A), (B) and (C); wherein, (A) is a resin compound;

(B) is either of resin-type particles or inorganic-type particles;

(B) is contained in an amount equal to or more than 20% by mass and less than or equal to 60% by mass in a total amount of 100% by mass of all solid content in the composition;

(B) comprises (B1) and (B2), wherein a total amount of (B1) and (B2) is 100% by mass of (B) is equal to or greater than 90% by mass, and a mass ratio of (B2) with respect to (B1) is equal to or greater than 1.8 and less than or equal to 3.3;

(B1) is inorganic-type small particles having a particle diameter $(d_1)$ equal to or greater than 0.05 μm and less than or equal to 0.4 μm;

(B2) is inorganic-type large particles having a particle diameter $(d_2)$ equal to or greater than 2 μm and less than or equal to 6 μm; and (C) is a diluent solvent.

* * * * *